United States Patent [19]
Allinquant et al.

[11] 3,837,444
[45] Sept. 24, 1974

[54] OLEOPNEUMATIC SHOCK ABSORBERS

[76] Inventors: Fernand Michel Allinquant, 53, Ave. Le Notre; Jacques Gabriel Allinquant, 12, Ave. Arouet, both of Sceaux, France

[22] Filed: Nov. 13, 1973

[21] Appl. No.: 415,363

[30] Foreign Application Priority Data
Nov. 17, 1972 France .............................. 72.40984

[52] U.S. Cl. ................. 188/315, 188/269, 188/298, 267/64 R
[51] Int. Cl. .............................................. F16f 9/08
[58] Field of Search ........... 188/315, 322, 269, 298; 267/64 R

[56] References Cited
UNITED STATES PATENTS

| | | | |
|---|---|---|---|
| 3,222,049 | 12/1965 | Tuczek | 267/64 R |
| 3,536,312 | 10/1970 | Lohr | 267/64 R |
| 3,554,524 | 1/1971 | Riehl | 267/64 R |
| 3,593,977 | 7/1971 | Hahn | 267/64 R |

FOREIGN PATENTS OR APPLICATIONS
751,164 6/1956 Great Britain ..................... 188/322

*Primary Examiner*—Trygve M. Blix
*Assistant Examiner*—Edward R. Kazenske
*Attorney, Agent, or Firm*—Staas, Halsey & Gable

[57] ABSTRACT

An oleopneumatic shock absorber comprising two coaxial tubes separated by an annular space which is divided by a transverse partition into two compartments each containing a chamber containing hydraulic fluid, each chamber being separated from a respective chamber containing gas by a sleeve of elastomeric material provided with an inner annular flange at its end adjacent to the partition, and with an outer annular flange at its end adjacent to one end of the shock absorber, wherein there is provided a device screwed onto the shock absorber so as to compress the outer flange of one of the sleeves against a fixed part of the shock absorber thus closing a passage which opens into the adjacent chamber containing gas and which communicates with a gap included between the cooperating threads of the shock absorber and of the device, and an annular unit which is supported on the device by a distance-piece so as to compress the inner flange of the one resilient sleeve against a further fixed part of the shock absorber in order to close another passage linking the two chambers containing gas via the transverse partition.

9 Claims, 7 Drawing Figures

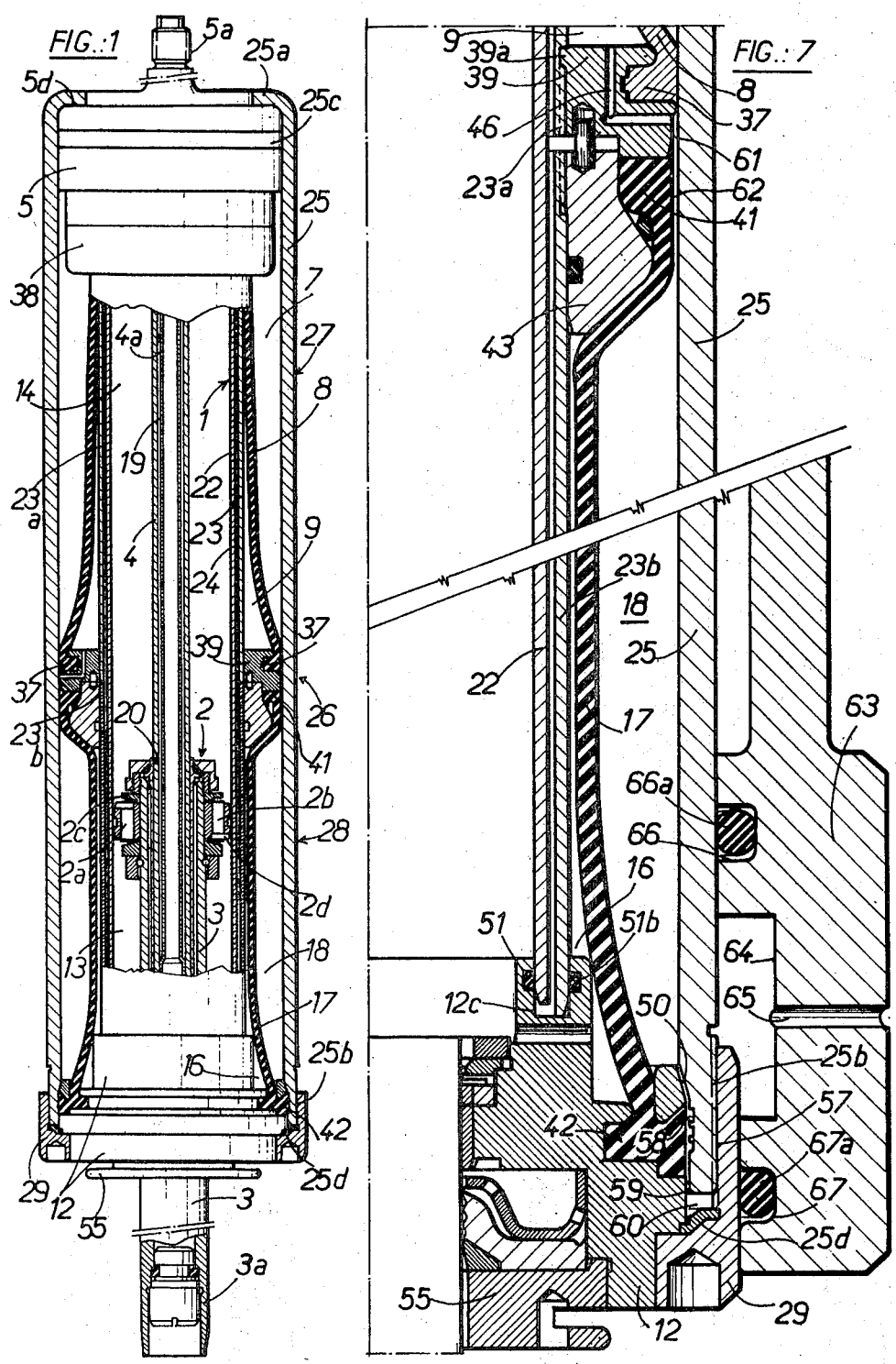

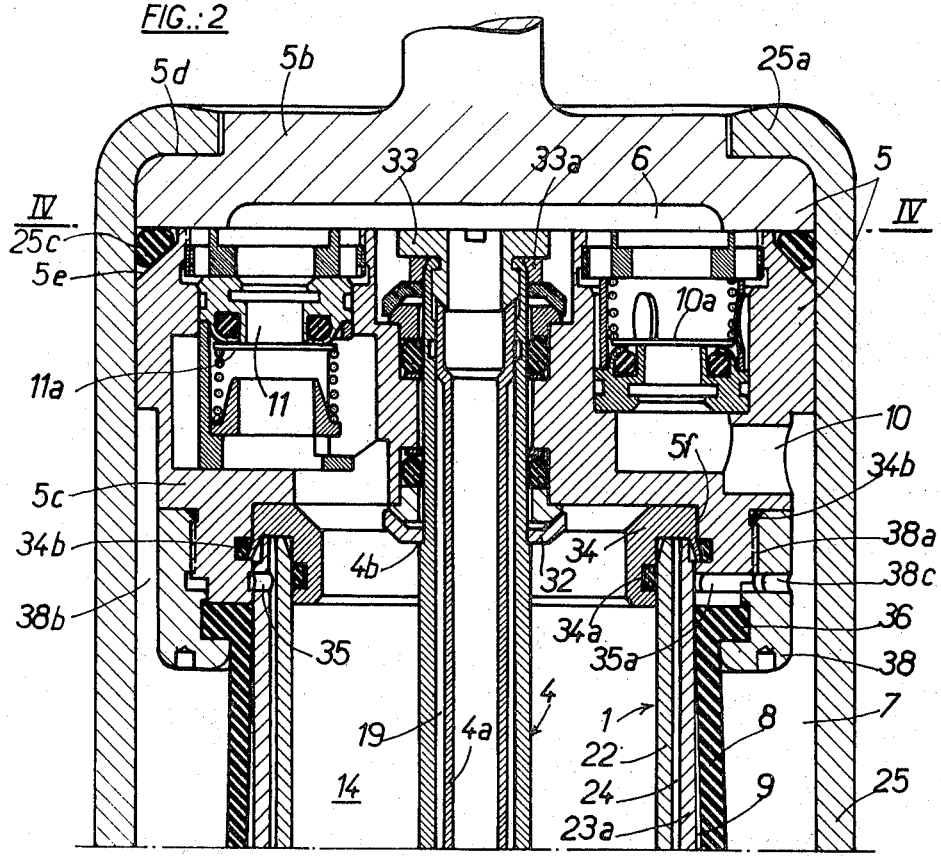
FIG.: 2
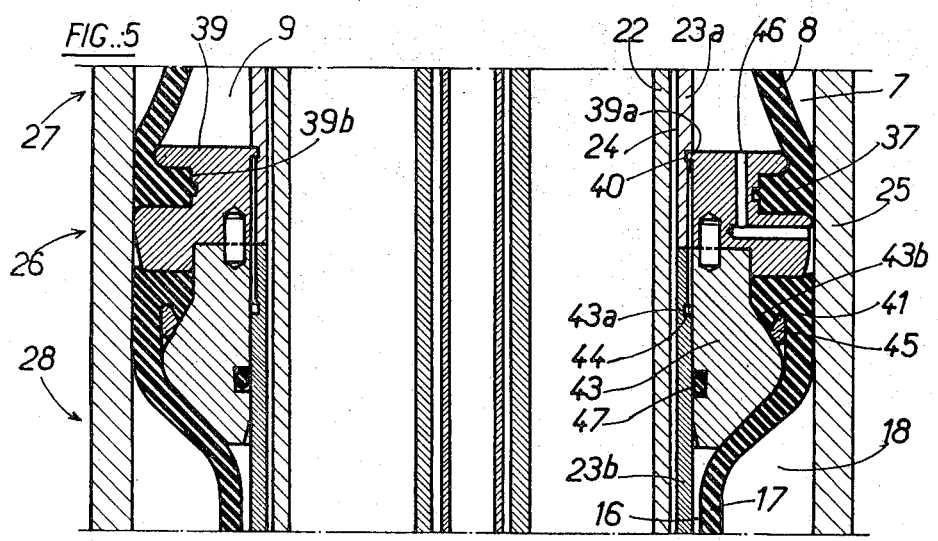
FIG.: 5

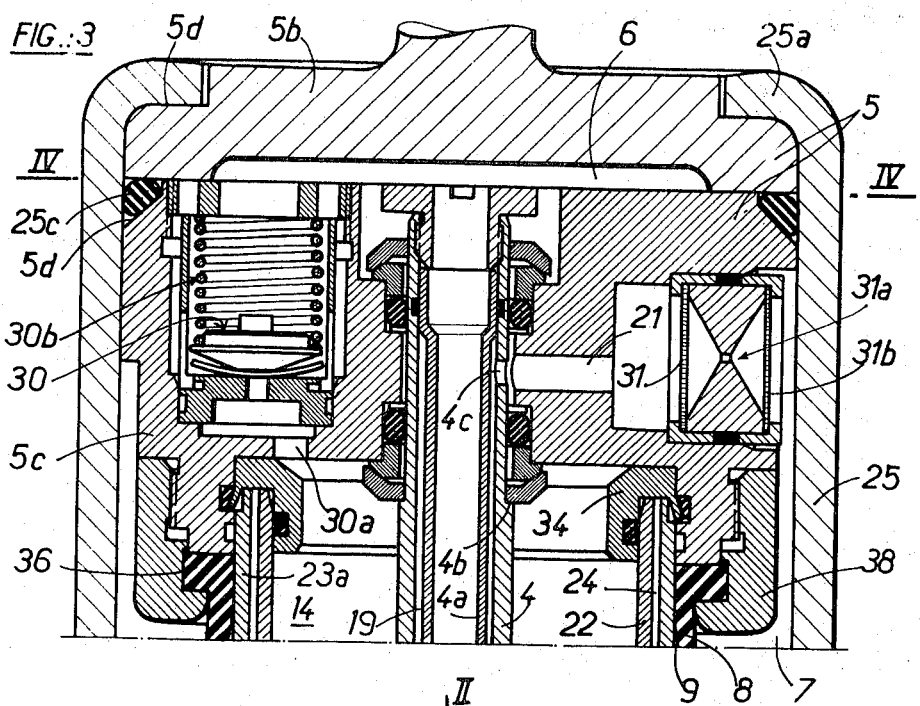
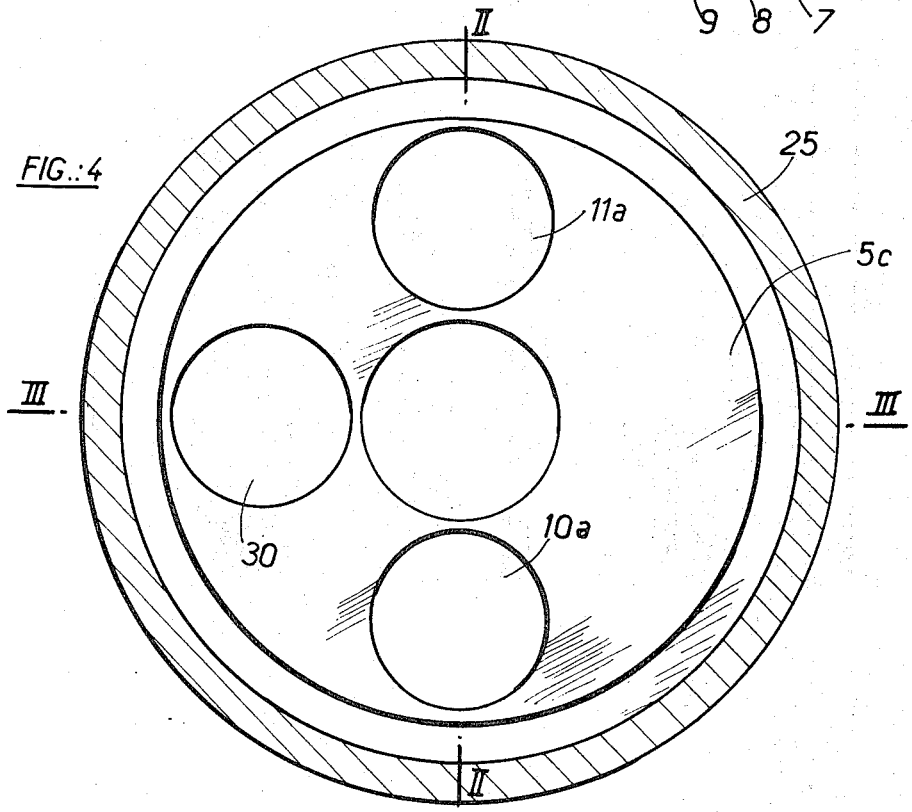

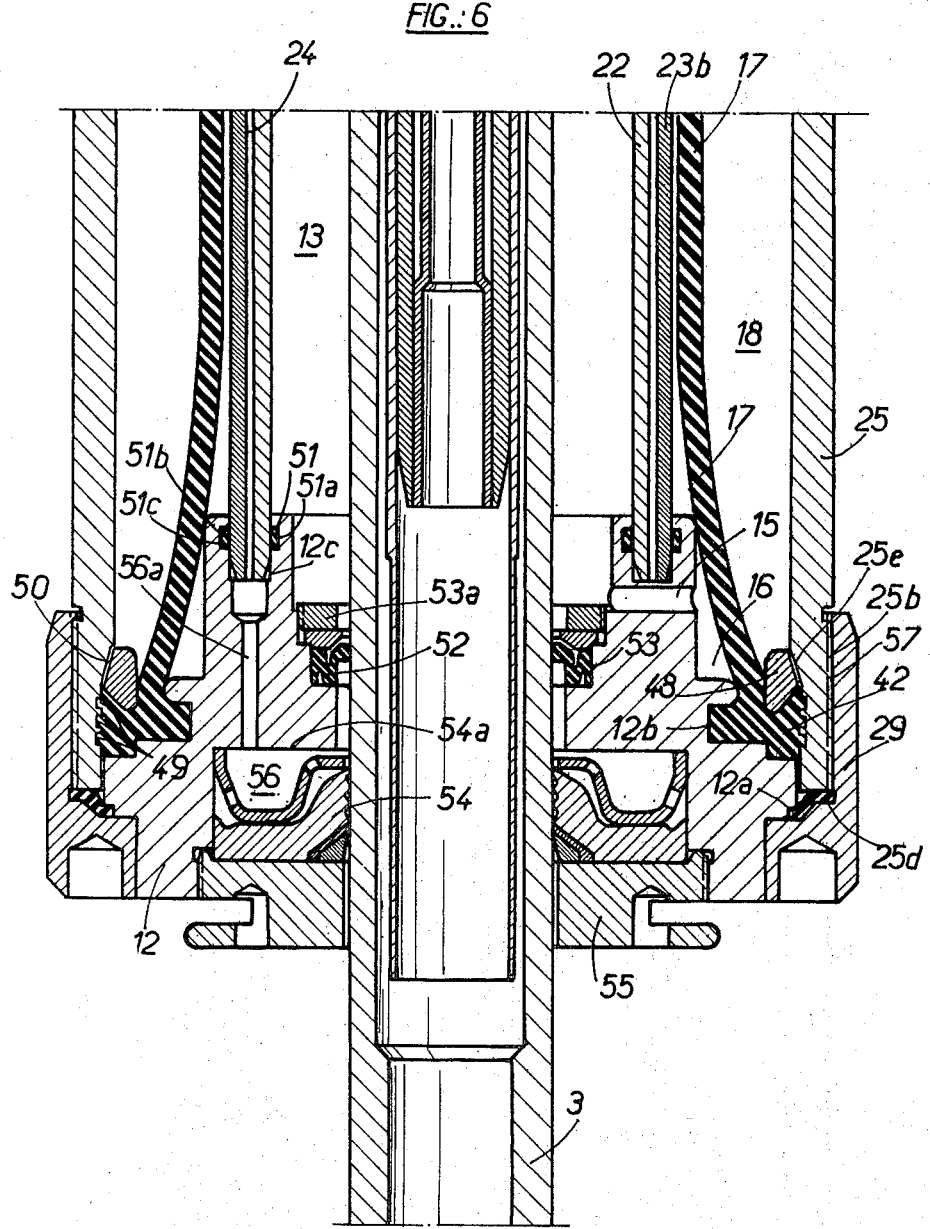
FIG.: 6

OLEOPNEUMATIC SHOCK ABSORBERS

This invention relates to oleopneumatic shock absorbers provided with an automatic system for adjustment of the trim by a self-pumping action, these being employable more especially for the suspension of motor vehicles. The invention, put more particularly, concerns a shock absorber of the type which comprises two coaxial, interdependent tubes separated by an annular space divided by a transverse partition into two oleopneumatic compartments which each contain a chamber filled with hydraulic fluid separated by a sleeve made of elastomeric material (which forms a resilient membrane) from a chamber filled with pressurized gas. Each of the said sleeves is provided at either end with annular flanges one of which is squeezed against a part which closes off one end of the shock absorber, and the other one of which is squeezed against the transverse partition, thus ensuring the fluid-tightness of each of the chambers containing gas under pressure. The flange of each sleeve that gets squeezed against the transverse partition will hereinafter be called the inner flange, and the other flange will be called the outer flange.

A shock absorber of this type is described more especially in U.S. Pat. No. 3,729,184, in which one of the compartments forms an oleopneumatic spring device functioning in co-operation with an assembly comprising a piston and a piston rod movable to-and-fro inside the inner tube, which is full of hydraulic fluid and constitutes the cylinder of the shock absorber, and the other compartment forms a reserve of hydraulic fluid under pressure. An arrangement for automatic trim adjustment by a self-pumping action, operated by the movement of the piston inside the cylinder, functions by exchanges of hydraulic fluid between the cylinder and the two compartments.

The design of a shock absorber of this type is rather complicated, in view of the fact that it is necessary to provide means for filling it with hydraulic fluid and with gas at the appropriate pressure. In already known embodiments, this filling procedure is effected by means of several ducts fitted with valves or closed by point screws, these ducts opening at suitable locations on to the various chambers and the various compartments of the shock absorber.

The present invention has for its object improvements which make it possible to provide a shock absorber lacking these filling ducts, and hence of a simpler construction and of a more economical design.

According to the invention, to this end there is provided a device which is screwed onto the shock absorber in order to compress the outer flange of one of the resilient sleeves against a fixed part of the shock absorber so as to close a passage which opens into the adjacent space and communicates with the gap included between the co-operating threads of the shock absorber and of the said device, and an annular unit which finds support on the latter by way of a distance-piece so as to compress the inner flange of the said resilient sleeve against a further fixed part of the shock absorber in order to close another passage linking the two spaces via the transverse partition. By unscrewing the device a little, the compression of the two flanges is relieved, the two passages thus being opened, therefore making it possible to insufflate the compressed gas into the two spaces by way of the gap between the threads.

The insufflation of gas is preferably effected from the side of the shock absorber that surrounds the piston rod, and the adjacent annular compartment will therefore with advantage contain the oleopneumatic spring arrangement. The end of the shock absorber positioned on the opposite side can thus be closed off by a breechpiece which is not traversed by any orifice or filling duct.

According to one feature of the invention this facility is usefully employed for accomodating within the breechpiece the suction and delivery valves of the device, which is operated by the movement of the piston and which pumps hydraulic fluid from the reserve situated in the adjacent annular compartment to the interior of the cylinder, as well as a filter positioned upstream of a nozzle which discharges into the said reserve hydraulic fluid collected upstream of the filter, inside the cylinder, by way of an aperture made in the wall of the latter and uncovered by the piston when the extension of the shock absorber exceeds a predetermined length.

The invention will now be further described, by way of example, with reference to the accompanying drawings, in which:

FIG. 1 shows a shock absorber according to the invention, with a fractional view in longitudinal section;

FIGS. 2 and 3 show on a larger scale the breechpiece of the shock absorber as viewed in sections taken along the lines II—II and III—III respectively in FIG. 4;

FIG. 4 is a view of a diagrammatic section taken along the line IV—IV in FIGS. 2 and 3;

FIGS. 5 and 6 are views similar to FIG. 2 and show respectively the transverse partition and the bottom of the shock absorber traversed by the piston rod; and FIG. 7 is an axial half-sectional view similar to FIGS. 5 and 6, and showing the insufflation into the shock absorber of pressurized gas.

The oleopneumatic shock absorber shown essentially comprises a cylinder 1 in which there slides an annular piston 2 carried by a hollow piston rod 3 which itself slides along a hollow plunger 4 attached to the breech-piece 5 of the cylinder (shown in elevation in FIG. 1) and opening into a recess 6 (see FIGS. 2 and 3) appertaining to the said breech-piece. The said recess 6 may receive oil from an annular reservoir 7 which surrounds the cylinder 1 over a portion of its vertical dimension and is separated by a resilient sleeve 8 from an annular chamber 9 containing gas under pressure, the oil being delivered via a passage 10 (FIG. 2) provided in the breech-piece 5 and fitted with a check-valve 10a. A further passage 11, likewise provided in the breech-piece 5 and fitted with a check-valve 11a, makes it possible for the oil to pass from the recess 6 into the cylinder 1. The to-and-fro movement of the piston rod 3 along the plunger 4 therefore produces a pumping action for oil from the reservoir 7 into the cylinder 1.

The piston rod 3 passes through a wall 12 which closes off the cylinder 1, and the piston 2 is traversed by passages 2a, 2b fitted with valves 2c, 2d which retard the flow of oil through the piston, from the annular chamber 13 surrounding the rod 3 to the chamber 14 positioned on the other side of the piston, and vice versa. The annular chamber 13 communicates, via a passage 15 (FIG. 6) provided in the wall 12, with an annular chamber 16 which surrounds the cylinder 1 and is separated by a resilient sleeve 17 from a further annular chamber 18 containing pressurized gas. The interior of the cylinder 1 communicates with the reservoir 7 via a passage 19 made up of the space included between the hollow plunger 4 and a tube 4a the external diameter of which is smaller than the bore of the plunger 4, the said tube being set in place in a fluid-tight manner by means of an expansion technique at each end of the plunger 4. The said passage 19 opens into the cylinder virtually in the middle of the vertical dimension of the latter by way of an aperture 20 (FIG. 1), and is linked with the reservoir 7 via a duct 21 (FIG. 3) provided in the breech-piece 5.

The breech-piece 5 and the piston rod 3 are provided with parts 5a, 3a which makes it possible to attach them to a suspended mass and to a non-suspended mass respectively, both appertaining to a vehicle. When the vehicle is in motion, the to-and-fro motion of the piston constantly brings about, as has been explained hereinbefore, a pumping action for oil from the reservoir 7 into the chamber 14 and, via the passages 2a and 2b, a flow of oil between the latter chamber and the annular chamber 13 which communicates with the chamber 16, this latter co-operating with the pressurized air of the chamber 18 to form a pneumatic spring arrangement which supports - at least partially - the weight of the suspended mass. If the piston rod 3 covers the aperture 20, the inflow of oil from the reservoir 7 into the cylinder brings about an extension of the jack until the said aperture is uncovered and makes the return of oil to the reservoir possible via the passages 19 and 21. If the jack is extended further, the return of oil via the said aperture and passages will bring about a shortening of the jack until the piston 2 once more covers the aperture 20. The pumping system therefore co-operates with the return passages to provide automatic adjustment of the trim of the suspension, the piston 2 always being positioned in the vicinity of the aperture 20, whatever the load on the vehicle. The pumping system also co-operates with the valves 2c, 2d of the piston to provide damping for the suspension.

The wall of the cylinder 1 is made up of a tube 22 which is surrounded by a further tube 23 divided into two aligned lengths 23a, 23b (FIG. 5), a small annular gap 24 being arranged between the tubes 22 and 23 for a purpose that will be explained hereinafter. The tube 23 is itself surrounded by an outer tube 25, and the annular space included between the tubes 23 and 25 is divided by means of a transverse partition 26 into two compartments 27 and 28, compartment 27 containing the chamber 7 and the space 9 which together constitute the reserve of oil under pressure, while the compartment 28 contains the chamber 16 and the space 18 which together make up the oleopneumatic spring arrangement.

The breech-piece 5 (FIGS. 2 and 3) is made up of two superimposed parts 5b, 5c, part 5b being provided on its outer surface with the part 5a and with a rebate 5d, and on its inner surface with the recess 6. The upper end of the tube 25 is set at 25a in to the rebate 5d. The part 5c is squeezed against the part 5b by the tubes 22, 23 which find support on the wall 12, itself supported on a threaded bush 29 screwed onto a threaded portion 25b of the outer tube 25. Fluid-tightness between the outer tube 25 and the breech-piece 5 is ensured by a seal 25c squeezed between the part 5b and a bevel 5e on the part 5c, and fluid-tightness between the tube 25 and the wall 12 is ensured by a seal 25d squeezed between the bush 29 on the one hand, and - on the other hand - the lower edge of the tube 25 and a peripheral shoulder 12a of the wall 12 (FIG. 6).

The part 5c of the breech-piece also acts as a valve box and as a support for the hollow plunger 4. As will be seen in FIGS. 2, 3 and 4, the suction valve 10a and the delivery valve 11a are diametrically opposite, thus making it possible in addition to situate, in two areas diametrically opposite each other and regularly spaced out at an angle to the two valves 10a and 11a, a safety valve 30 which opens into the recess 6 and which communicates via a passage 30a with the chamber 14, and a filter 31 upstream of a nozzle 31a at the exit from the duct 21 into the chamber 7. In the event of accidental overpressure in the chamber 14, the safety valve 30 opens against the urging of a spring 30b and allows oil to flow into the recess 6, and from there into the hollow plunger 4 and the piston rod 3, so bringing about the extension of the shock absorber, so that the latter runs no risk of being damaged by overpressure. The nozzle 31a makes it possible to adjust the throughput of oil collected via the aperture 20, and by virtue of the filter 31 runs no risk of getting obstructed. The plunger 4 is retained in a central bore through the part 5c, with the interposition of suitable seals, by a clamping effect between a washer 32 (FIG. 2) which is supported on a shoulder 4b of the plunger, and a threaded plug 33 screwed into the latter and supported on a distance-piece 33a. The passage 19 of this plunger 4 communicates with the duct 21 via an orifice 4c in its outer wall (FIG. 3).

The tube 22 of the cylinder and the length of tube 23a rest on an annular part 34 (FIG. 2) which is positioned in an annular recess 5f of the part 5c of the breech-piece, and the annular gap 24 communicates via an orifice 35 in the length of tube 23a with a passage 35a arranged in the part 5c and opening into the annular chamber 7. An annular fitting 34a, compressed between the part 34 and the tube 22 ensures the fluid-tightness of the cylinder 1. A further annular fitting 34b, compressed between the parts 34 and 5c, ensures the fluid-tightness of the duct comprising the annular gap 24, the orifice 35 and the passage 35a.

The annular membrane constituted by the resilient sleeve 8 is provided at its upper (or outer) end with an annular flange 36, and at its lower (or inner) end with a further annular flange 37. The flange 36 is squeezed against the lower surface of the part 5c and against the length of tube 23a by a threaded bush 38 which is screwed onto a threaded portion 38a of the said part 5c. The flange, subject to such pressure, separates the space 9 from the chamber 7 as regards their upper parts in a fluid-tight manner. An annular gap 38b separates the bush 38 from the tube 25 so that the chamber 7, containing oil and situated on the outer side of compartment 27 and consequently in contact with the outer tube 25, is able to communicate with the passages 10 and 21 in the breech-piece (FIGS. 2 and 3); it communicates with the passage 35a via an orifice 38c in the bush 38 (FIG. 2).

Referring to FIG. 5, it will be seen that the annular partition 26 separating compartments 27 and 28 comprises an annular part 39 provided on its inner surface with an annular rib 39a which fits in a groove 40 arranged near the lower end of the length of tube 23a, and provided on the outside with an annular recess 39b into which there fits the flange 37 of the resilient sleeve 8, the said flange being compressed between the recess 39b and the outer tube 25 so as to separate the chamber 7 from the space 9 as regards their lower parts in a fluid-tight manner. The sleeve 17 is provided in its upper (or inner) part with an annular flange 41, and in its lower (or outer) part with an annular flange 42 (FIGS. 1 and 6). The upper (or inner) flange 41 is squeezed against the part 39 and against the tube 25 (FIG. 5) by an annular part 43 provided on its inner surface with an annular rib 43a fitting in a groove 44 arranged near the upper end of the length of tube 23. The annular part 43 includes an inclined outer surface 43b on which there rests an annular beaded unit 45 which co-operates with the part so as to compress the flange 41. It should be noted that, because of this arrangement, it is the space 18 containing gas that is positioned on the outer side of the compartment 28. This space 18 is able to communicate with the space 9, when the flange 41 is not under pressure, by way of a passage 46 going through the part 39. However, when the said flange 41 is being squeezed by the part 43 and the beaded unit 45 against the part 39 and the tube 25, it blocks off the passage 46 and in a fluid-tight manner isolates the space 18 from the chamber 16 and the compartment 27. The chamber 16 is isolated from the space 9 and from the annular gap 24 by means of an annular seal 47 housed in a groove on the inner surface of the part 43.

It will be seen in FIG. 6 that the lower flange (or outer one) 42 of the resilient sleeve 17 is inserted in an annular recess 12b of the wall 12 and is squeezed by the latter against an annular beaded unit 48 in the form of a wedge resting on a part 25e (comprising a truncated-cone inner surface) of the tube 25. The squeezing effect is ensured by screwing the bush 29 onto the threaded portion 25b, so that the outer surface of the flange 42 resting on the wedge-shaped unit 48 becomes jammed against the inner surface of the tube 25 and penetrates into circular grooves 49 in this inner surface. In this position, the flange 42 isolates the compartment 18 and the chamber 16 in a fluid-tight manner, and more especially blocks longitudinal grooves 50 arranged along the outer surface of the beaded unit 48 resting on the truncated-cone surface 25e.

The lower edges of the tube 22 and of the length of tube 23b rest against the bottom of an annular recess 12c in the wall 12. An annular seal 51, housed in a groove 51a in this recess, is compressed against the inner surface of the tube 22 so as to ensure fluid-tightness between the chamber 13 of the cylinder and the annular gap 24, while fluid-tightness between the chamber 16 and this annular gap is ensured by an annular seal 51b fitting in an annular groove 51c of the recess 12c and squeezed against the outer surface of the length of tube 23b.

The piston rod 3 passes into a central orifice in the wall 12, and its fluid-tightness is ensured by a first seal 52 retained within a seat 53 arranged in the upper portion of this wall by a threaded ring 53a screwed into the seat, and by a second seal 54 retained within a further seat 54a arranged in the lower (or outer) surface of the wall 12 by a further threaded ring 55. The first seal 52 is applied against the rod 3 by the ring 53a and by the pressure from the chamber 13, but its fluid-tightness is not perfect, and a little oil may run along the rod 3 as far as a chamber 56 positioned in the seat 54a above the second seal 54. The said chamber 56 communicates via a duct 56a with the bottom of the recess 12c, and consequently with the annular gap 24 which itself communicates via the passage 35a and the orifice 38c with the chamber 7 (FIG. 2). The pressure prevailing in this chamber 7, and consequently in the chamber 56, is intermediate between the pressure in the chamber 13 and atmospheric pressure, so that the seal 54, which is lipped, gets applied against the rod 3 with moderate force, but nevertheless adequate to prevent any leak of oil to the outside. The chamber 56 is variable in both volume and pressure, and, because of its communicating with the chamber 7, it can never exert on the seal 54 any overpressure liable to cause it to burst.

All the parts of the block absorber can be slid inside the tube 25 when the apparatus is assembled. It is possible, for example, to turn upside-down the tube 25, set up on the part 5b, so as to constitute a receptacle which is filled with oil, and then to introduce into this receptacle the part 5c equipped with the plunger 4, tubes 22 and 23, and the ring 38 applying pressure to the flange 36. After this assembly has been inserted in the receptacle, the parts 39 and 43 of the partition 26 are positioned on the tube 23, and the flanges 37 and 41 are fitted in the tube 25, pressure being exerted on the tubes 22 and 23. Then the rod 3, filled with oil, along with the seals 52 and 54 and their rings 53a and 55, is put in place inside the partition 12, the said rod 3 is fitted over the plunger 4, the tubes 22 and 23 along with the seals 51 and 51b are fitted in the recess 12c, the beaded unit 48 is placed in position, the flange 42 is positioned in the recess 12b and is fitted inside the tube 25, and pressure is applied against the wall 12 until the part 5c of the breech-piece abuts the part 5b. Then the threaded bush 29 is screwed on so that the components of the shock absorber are placed in the position shown in FIGS. 1 to 6. It should be noted that, if these operations are carefully carried out, all the chambers of the shock absorber and all the passages which make them communicate fill with oil, with the exception of the spaces 9 and 18.

To insufflate compressed air into the compartments 9 and 18. the bush 29 is unscrewed several turns (see FIG. 7). This operation has the effect of allowing the wall 12 and the part 43, accompanied by the tube length 23b, to drop down, so that the annular flanges 41 and 42 are no longer being squeezed against the outer tube 25. The space 18 is then in communication with the gap 57 included between the co-operating threads of the bush 29 and of the tube 25 by way of the grooves 50, a gap 58 formed between the flange 42 and the tube 25, a gap 59 existing between the latter and the periphery of the wall 12, and a chamber 60 which is formed below the lower edge of the tube 25 between the periphery of the wall 12 and the bush 29. Further, the space 9 is in communication with the space 18 by way of the duct 46, a gap 61 existing between the periphery of the part 39 and the tube 25, and a gap 62 which is formed between the latter and the flange 41. Then, around the lower portion of the shock absorber there is fitted an annular sleeve 63 provided on the inside with recessing 64 which is positioned opposite the upper portion of the bush 29, and provided, on either side of the said recessing, with two circular grooves 66, 67 housing two toric seals 66a, 67a which are applied in a fluid-tight manner against the tube 25 and the bush 29 respectively. Into the recess 64 there opens a bore 65 to which may be fitted a connection (not shown here) which makes it possible to feed in gas under pressure. The gas under pressure being supplied to the recess 64 passes by way of the gaps 57, 59, 58 and the grooves 50 into the chamber 18, and passes from there into the chamber 9 by way of the gaps 62 and 61 and the passage 46. During this operation, it is possible to unscrew the bush 55 slightly so as to allow a little oil to escape from the shock absorber so as to permit the spaces 9 and 18 to expand by repelling the resilient sleeves 8 and 17 so as to take in a little more gas under pressure. Naturally the ring 55 should be screwed home again forthwith so as to prevent oil leaks. When the shock absorber has been supplied with compressed gas, the bush 29 is screwed up so as to return the components to the position shown in FIGS. 1 to 6, and the sleeve 63 is removed.

It should be noted that the design of the shock absorber, which makes the filling operation described above possible, is simplified by the fact that the spaces containing gas are arranged so that one, 18, is on the outer side of the annular compartment 28 located opposite to the breech-piece 5 (that is, in contact with the outer tube 25), and the other, 9, is on the inner side of the other compartment, 27. However, other arrangements are possible.

It should also be noted (FIG. 3) that the nozzle 31a is protected not only by the filter 31 positioned upstream in the direction of flow of the oil from the cylinder 1 to the chamber 7 (via the aperture 20 and the ducts 19 and 21), but also by a further filter 31b positioned between the nozzle 31a and the chamber 7. It may in practice happen, for instance when a vehicle to which the shock absorber is fitted is being unloaded, that some oil flows from the chamber 7 to the cylinder 1 by way of the nozzle 31a, the ducts 21 and 19, and the aperture 20. The nozzle 31a will therefore not incur any risk of being blocked by impurities whatever the direction of flow of the oil.

We claim:

1. An oleopneumatic shock absorber comprising inner and outer coaxial tubes separated by an annular space, the inner of the said tubes defining a cylinder, a movable piston in said cylinder, piston rod connected to said piston and extending through one end of said shock absorber, a transverse partition dividing said space into two compartments, a sleeve of elastomeric material separating each compartment into inner and outer chambers, one chamber containing hydraulic fluid and the other chamber containing gas, an inner annular flange provided on said sleeves at said sleeves' end adjacent said partition and an outer annular flange provided on said sleeves at said sleeves' end adjacent to one end of the shock absorber, a device screwed onto one end of said shock absorber so as to compress said outer flange of one of said sleeves against a fixed part of said shock absorber thus closing a first passage which opens into the chamber containing gas adjacent said device and which communicates with a gap included between the cooperating threads of the shock absorber and said device, an annular unit, and a distance-piece supporting said annular unit so as to compress said inner flange of the said one resilient sleeve against a further fixed part of the shock absorber spaced from said fixed part in order to close a second passage linking said two chambers containing gas through said transverse partition.

2. A shock absorber as claimed in claim 1, in which said device is positioned on the end of the shock absorber which surrounds the piston rod of said shock absorber.

3. A shock absorber as claimed in claim 2, in which an oleopneumatic spring arrangement is provided within said annular compartment adjacent to said device.

4. A shock absorber as claimed in claim 3, in which a breech-piece closes off the end of the shock absorber positioned on the end opposite to the piston rod, suction and delivery valves of a pumping-action device operated by the movement of the piston of the shock absorber being accommodated in said breech-piece so as to pump liquid between the compartment adjacent to the breech-piece and the cylinder of the shock absorber.

5. A shock absorber as claimed in claim 4, in which a safety valve is provided in said breech-piece.

6. A shock absorber as claimed in claim 5, in which a nozzle is provided in the breech-piece, said nozzle making it possible to adjust a flow of hydraulic fluid between the cylinder and the compartment adjacent to the breech-piece, and in which a filter is positioned upstream of the nozzle in the normal direction of the said flow.

7. A shock absorber as claimed in claim 6, in which a filter is positioned in the breech-piece downstream of the nozzle in the normal direction of the said flow.

8. A shock absorber as claimed in claim 1, in which said chambers containing gas are positioned on the outer side of said compartment adjacent said device and on the inner side of said compartment adjacent said breech-piece.

9. A shock absorber as claimed in claim 1, in which an intermediate tube is provided which encloses the inner tube and defines a third passage between the intermediate and inner tubes, the said intermediate tube being divided into two lengths one of which constitutes said distance-piece.

* * * * *